United States Patent [19]

Snow

[11] Patent Number: 4,520,902

[45] Date of Patent: Jun. 4, 1985

[54] LUBRICANT APPLYING SYSTEM AND INJECTOR MEANS

[75] Inventor: John P. Snow, Sagamore Hills, Ohio

[73] Assignee: Lubriquip-Houdaille, Inc., Warrensville Heights, Ohio

[21] Appl. No.: 486,310

[22] Filed: Apr. 19, 1983

[51] Int. Cl.³ .................. F16N 25/00; F16N 29/04
[52] U.S. Cl. .................. 184/7.4; 137/596.12; 184/6.1; 184/6.4; 184/6.28; 184/29; 417/225; 417/304; 417/521
[58] Field of Search .............. 184/1 C, 6, 6.4, 6.28, 184/7 R, 7 CR, 7 D, 7 E, 7 F, 29, 6.1, 7.4; 417/225, 226, 265, 304, 349, 391, 401, 490, 501, 521; 137/596.12, 596.16, 625.69; 91/192; 222/335, 389

[56] References Cited

U.S. PATENT DOCUMENTS

| | | | |
|---|---|---|---|
| 2,005,166 | 6/1935 | Roberts | 184/7 E |
| 2,048,003 | 7/1936 | Hawks | 184/7 F |
| 2,141,022 | 12/1938 | Rotter | 184/7.4 |
| 2,339,532 | 1/1944 | Venable | 184/7 F |
| 2,448,583 | 9/1948 | Fox | 184/7.4 |
| 2,626,014 | 1/1953 | Schmid | 184/7 D |
| 2,973,058 | 2/1961 | Bricout | 184/7 E |
| 3,145,803 | 8/1964 | Cobert | 184/7 D |
| 3,664,462 | 5/1972 | Smith | 184/7 D |
| 3,730,297 | 5/1973 | Colgan et al. | 184/6.4 |
| 3,905,451 | 9/1975 | Williamson | 184/7 D |
| 3,995,717 | 12/1976 | Kroffke | 184/7.4 |
| 4,312,424 | 1/1982 | Taylor et al. | 184/6.4 |

FOREIGN PATENT DOCUMENTS

| | | | |
|---|---|---|---|
| 1068961 | 11/1959 | Fed. Rep. of Germany | 184/7 E |
| 252948 | 12/1930 | Italy | 184/7 E |

OTHER PUBLICATIONS

"Pulsed, Electrically Controlled, Centralized Lubrication Systems", I. A. Kanevskii, Machines and Tooling, vol. 45, No. 12, pp. 40–43, 1974.

Primary Examiner—David H. Brown
Assistant Examiner—John E. Griffiths
Attorney, Agent, or Firm—Hill, Van Santen, Steadman & Simpson

[57] ABSTRACT

A lubricant applying system which may have a plurality of lubricant injectors along a lubricant supply/return passage which receives lubricant under predetermined pressure through one end from a source for discharging and sequentially recharging the injector in one phase and in a second phase after the recharging permitting return of surplus lubricant from the injector through the passage to the lubricant source. A pressure sensor connected to the opposite end of the passage monitors pressure conditions in the passage. The lubricant injector has a displacement plunger and a cooperatively related metering plunger. The displacement plunger is responsive to lubricant passage line pressure which drives the displacement plunger in a displacement stroke, during which a passageway is connected by the displacement plunger with a metering chamber from which the metering plunger is driven by the pressure and the metering chamber charged while the metering plunger closes the lubricant passage. Upon release of pressure the displacement plunger is biased in a return stroke, and the metering plunger is biased into a metering stroke for driving the charge of lubricant from the metering chamber into a displacement chamber at the inner end of the displacement plunger. This also opens the lubricant passage for return of surplus lubricant to the source.

18 Claims, 5 Drawing Figures

LUBRICANT APPLYING SYSTEM AND INJECTOR MEANS

BACKGROUND OF THE INVENTION

1. Field of the Invention

This invention relates to a new and improved lubricant applying system and injector means, and is more particularly concerned with efficiently supplying lubricant at intermittent intervals to a plurality of points of use.

2. Description of Prior Art

Numerous and varied arrangements have been proposed for injecting lubricant to relatively movable surfaces, such as shaft bearings individually or collectively in multi-bearing arrangements. For the multi-bearing arrangements, centralized lubricating systems have been devised.

In an early example as shown in U.S. Pat. No. 2,141,022, a single-line lubricant supplying apparatus is disclosed in which a lubricant pump is controlled by a timing switch associated with a pressure switch responsive to pressure surge from a relief valve in a bypass located upstream from the lubricant injectors which have tell-tales functioning to close contacts in an electrical monitoring circuit which reveals whether or not all of the injectors are functioning properly. The injectors in that system have a lubricant charge displacing piston controlled by a pressure operated valve in the injector.

In a later U.S. Pat. No. 2,448,583 an injector structure is disclosed in which a metering piston has a tell-tale stem and is adapted for driving a metered charge of lubricant into a displacement chamber from which the lubricant is driven by a displacement piston into the lubricant line.

Attention is also directed to U.S. Pat. No. 3,995,717 which discloses a unilinear sequential firing piston arrangement in a lubricant injector, and in which the several injectors are shown as adapted to operate in parallel or in sequence.

However, there is still need for improvement in lubricant applying systems, having regard to simplification of structure combined with better operation, simpler replacement capability, reliable failure detection, and the like. As will become apparent, the ennumerated prior U.S. patents do not meet these desirable attributes which are supplied by the present invention.

SUMMARY OF THE INVENTION

In its broader aspects, the present invention affords a lubricant applying system provided with lubricant injector structure having means for lubricant delivery to respective points of use, and comprising a lubricant supply/return passage means connected with the injector structure. Operating means at one end of the passage means functions cyclically for in one phase supplying lubricant under predetermined pressure from a source through the passage means for discharging and recharging the injector structure, and for in a second phase and after the recharging permitting return of surplus lubricant from the injector structure through the passage means to the source in a sequential manner. Significantly, pressure sensing and signalling means are connected to an opposite end of the passage means for monitoring pressure conditions in the passage means.

For the injector structure, the present invention provides an injector assembly adapted for connection in a supply relationship with a plurality of like lubricant injectors along a lubricant passage adapted for cyclically alternately supplying lubricant under line pressure to the injectors and for releasing pressure therefrom, and each injector adapted for lubricant delivery to a respective point of use, the assembly including a lubricant displacement plunger and a lubricant metering plunger. Means normally bias the displacement plunger toward one end. A pressure responsive head on said one end of the displacement plunger is adapted for direct exposure to line pressure in the passage for shifting of the displacement plunger in opposition to the biasing means in a lubricant displacement stroke toward its opposite end and into a lubricant displacement chamber at such end from which lubricant is thereby ejected through a port communicating with a point of use, the displacement plunger being then returned to said one end upon releasing of the pressure in the passage. A metering chamber is defined at one end of the metering plunger and is adapted to be substantially occupied by the metering plunger in one operating mode of the metering plunger and to be vacated by the metering plunger in a second operating mode thereof. A passageway connects the metering chamber and the displacement chamber. Means normally bias the metering plunger into its one operating mode. The metering plunger is adapted in its one operating mode for opening the lubricant passage and by occupying the metering chamber driving lubricant from the metering chamber through the passageway into the displacement chamber. In its second operating mode, the metering plunger is adapted to close the lubricant passage and vacate the metering chamber in response to lubricant pressure in the metering chamber. Metering chamber pressurizing and recharging means controlled by the displacement plunger selectively effects communication between the lubricant passage and the passageway in the displacement stroke of the displacement plunger, so that lubricant under pressure will be charged into the metering chamber and cause the metering plunger to shift into its second operating mode. When the pressure is released, the metering chamber will be shifted into its first operating mode by its biasing means for thereby driving a charge of lubricant from the metering chamber through the passageway into the displacement chamber.

BRIEF DESCRIPTION OF THE DRAWINGS

Other objects, features and advantages of the present invention will be readily apparent from the following description of a representative embodiment thereof, taken in conjunction with the accompanying drawings, although variations and modifications may be effected without departing from the spirit and scope of the novel concepts embodied in the disclosure, and in which.

DETAILED DESCRIPTION

Figure 1:
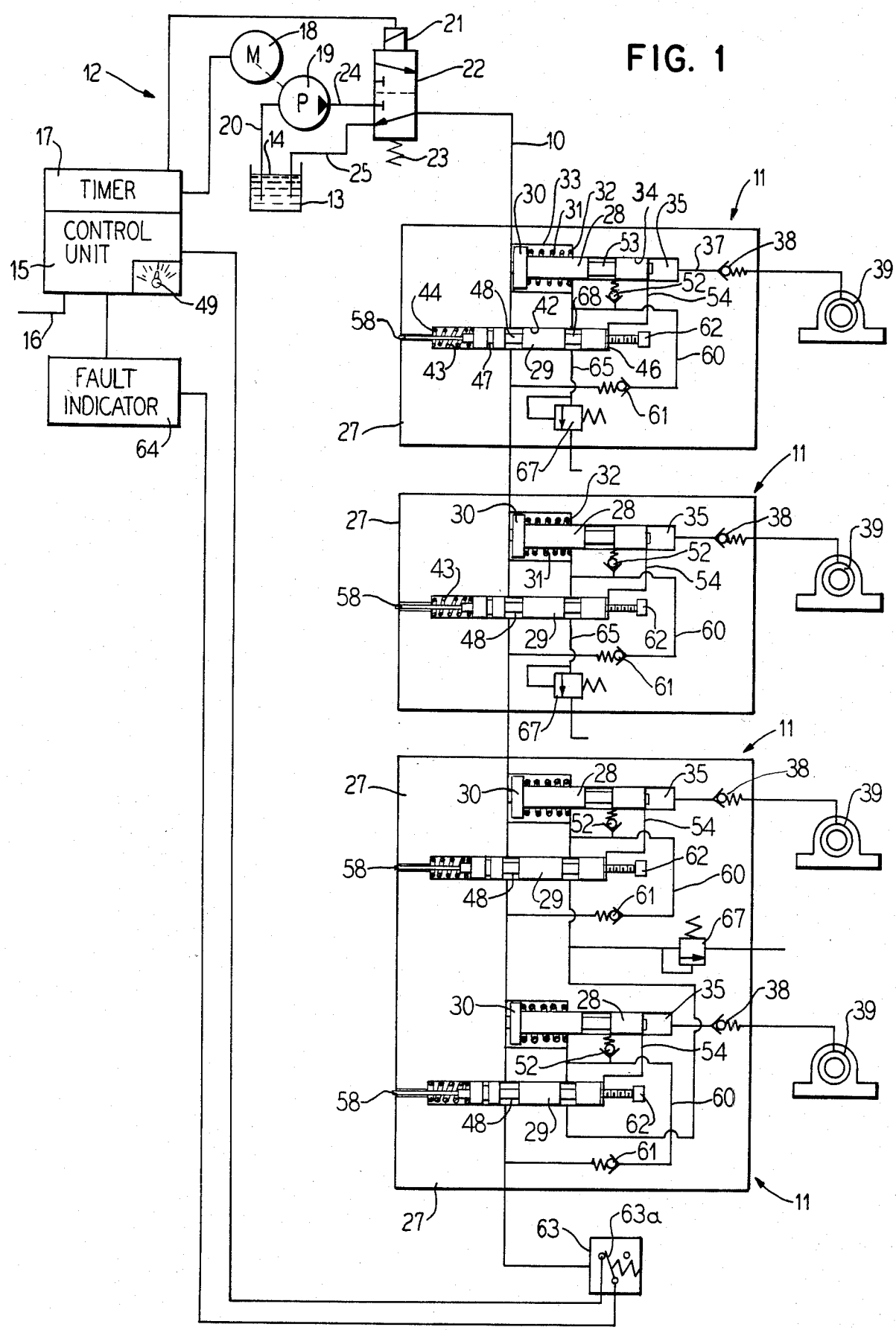
FIG. 1 is a schematic illustration of a lubricant supplying system embodying the invention.

As schematically shown in FIG. 1, a lubricant applying system embodying the invention comprises a lubricant supply line or passage 10 connected a plurality of lubricant injectors 11. At one end the passage 10 is connected with operating means 12 functioning cyclically for in one phase effecting supplying from a source such as a reservoir 13 lubricant 14 under predetermined pressure through the passage for discharging and recharging the injectors 11. In a second phase, and after the recharging has been effected, surplus lubricant is returned sequentially from the injectors through the passage 10 to the reservoir 13. To this end, a lubricant supplying system control unit 15, supplied with electrical energy from a suitable source 16, functions through a timer 17 for cyclical operation of a motor 18 which drives a pump 19 having supply source communication through a conduit 20 with the reservoir 13. Also controlled by the timer is a solenoid 21 adapted when energized to shift a two-way valve 22 in opposition to biasing means 23 for effecting pressurized lubricant delivery communication, by means of a pressure duct 24 leading from the pump 19, with the lubricant supply passage 10. It will be understood that the timer energizes, i.e., activates, the motor 18 and the solenoid 21 in coordinated relation. When the motor 18 and the valve solenoid 21 are deenergized, the valve biasing means 23 shifts the valve 22 into a lubricant return dumping mode wherein the supply passage 10 is connected with a return duct 25 into the reservoir 13.

Any commercially available programmer controller may be utilized as the control unit 15 and timer 17 such as, for example, MAXI-MONITOR ® models WMX or WMP sold by the Lubriquip Division of Houdaille Industries, Inc., which also include the fault indicator 64.

Each of the lubricant injectors 11 is embodied in a housing 27 which may be an individual body block for each injector or may be a common manifold body block cored or bored as necessary to accommodate the various components. For example, in FIG. 1 the upper two injectors 11 are shown as having individual housings while the lower two injectors 11 are shown as having a common housing. In whatever form the housing structure 27 may take, the lubricant passage 10 desirably extends transversely therethrough from one side to the opposite side and continuously connects all of the injectors 11 into the passage. When the supply passage 10 is pressurized, that is lubricant 14 is pumped under pressure into the supply passage, all of the injectors 11 will be equally supplied at substantially the same time, with negligable variance as may be caused by line friction, from the upstream to the downstream extent of the passage 10.

Each of the injectors 11 includes a lubricant displacement plunger 28 and a lubricant metering plunger 29. Each of the plungers 28 and 29 is preferably of elongate cylindrical form.

In a preferred arrangement, the displacement plunger 28 has at one end a pressure responsive head 30 which is located for direct exposure to pressure in the passage 10 for effecting shifting of the displacement plunger 28 toward its opposite end, in opposition to biasing means in the form of a coiled compression spring 31 disposed about the plunger 28 and thrusting at one end against the back of the head 30 and at the opposite end against an annular shoulder 32 at the root of a clearance counterbore 33 opening toward the passage 10 from a guide bore 34 in which the plunger 28 is reciprocatingly slidably engaged.

A lubricant displacement chamber 35 is defined by the inner end of the bore 34, that is, at the end of the plunger 28 which is opposite to the head 30. Lubricant under pressure from the passage 10 acting on the exposed surface of the pressure head 30 is adapted to shift the plunger 28 in opposition to the biasing spring 31 into lubricant displacing relation into the chamber 35 for ejecting lubricant through a port 37 past a check valve 38 to a point of use such as a rotary bearing 39.

For mounting and replacement access to the displacement plunger 28, a removable screw plug 40 (FIGS. 2–5) of preferably a diameter about equal to the diameter of the counterbore 33 is secure in axial alignment with the counterbore. At its inner end, the plug 40 serves as a stop for the pressure end of the head 30 biased toward the plug and desirably having on its pressure face a projection spacer 41 which is of smaller diameter than the body of the plunger 28 to facilitate pressure-responsiveness of the pressure head 30.

Each of the metering plungers 29 comprises an elongate, preferably cylindrical body which may be of the same diameter as the body of the companion displacement plunger 28 and is reciprocatingly slidably engaged in a somewhat longer complementary bore 42 in the housing structure 27, in spaced parallel relation to the displacement plunger bore 34 and traversing the lubricant pressure passage 10. Normally the metering plunger 29 is biased in the opposite direction from the bias imposed on the displacement plunger 28. For this purpose, biasing means desirably in the form of a coiled compression spring 43 is disposed to thrust at one end against a shoulder 44 which may be provided by a removable access closure plug 45 secured in the outer end of the bore 42. At its opposite, inner end, the biasing spring 43 thrusts against the adjacent, outer end of the plunger 29 and thus normally biases this plunger toward the opposite, inner blind end 46 of the bore 42. A sealing ring 47 is desirably carried by the outer end portion of the plunger 29 to prevent outward leakage of lubricant through the bore 42.

In the normal inwardly biased mode of the metering plungers 29, the lubricant passage 10 is opened through each of the injectors 11 by virtue of a bypass recess or groove 48 in each of the plungers 29 registering with the lubricant passage. This condition in the system is shown in FIG. 1, and is normally prevalent in the lubricant return, non-pressurized phase of the system which may be timed by means of the timer 17 to occur alternately at suitable intervals with a pressure phase of the system.

Figure 2:
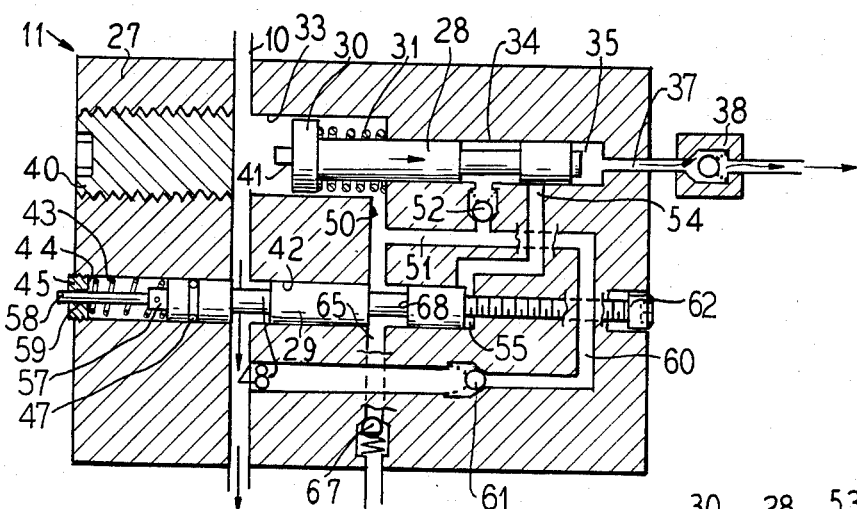
FIG. 2 is a schematic sectional elevational view showing one of the lubricant injectors of FIG. 1 in one phase of operation.

In a typical operating cycle of the lubricant-applying system, the timer 17 in cooperation with the control unit 15 energizes the motor 18 for the pump 19, and concurrently energizes the solenoid 21 to produce lubricant pressure in the passage 10 of a predetermined psi depending, of course, upon lubrication requirements. For example, a pressure of 2000 psi may be desirable, and the control unit 15 may be adjusted for an output pressure of that magnitude by means of a pressure adjustment device 49 associated with the control unit. Assuming that all of the injectors 11 are as shown in FIG. 1, as the pressure builds up in the pressure passage 10, each of the displacement plungers 28 is moved in opposition to its biasing spring 31 which may have a biasing resistance of on the order of 200 psi. This causes the inner end of the displacement piston 28 to move into the displacement chamber 35 from which the lubricant is driven on through the port 37 to the associated bearing 39 to be lubricated. Concurrently with the pressure head 30 advancing into the chamber within the counterbore 33, lubricant under pressure is available to flow past the pressure head, which is of suitably smaller diameter than the diameter of the counterbore 33, and to pass from the inner end of the counterbore chamber into a duct 50, as shown in FIG. 2.

Upon shifting of the plunger 28 inwardly, it acts as a spool valve and opens a branch 51 from the duct 50 past a check valve 52 and through a bypass clearance recess groove 53 into a passageway 54 (FIG. 3) which communicates with the inner end of the metering plunger bore 42 defining a metering chamber 55 between the blind end 46 and the inner end of the metering plunger 29. Metering mode shifting of the metering plunger 29 is thereby effected out of the metering chamber 55 to a limit of outward movement as defined by engagement of a head end stop boss 57 (FIG. 3) on the outer end of this plunger against the closure plug 45 serving as a stop shoulder. In this mode of the metering plunger 29, a telltale pin 58, extending through a clearance bore 59 in the plug 45, will indicate by its maximum projection that both the metering plunger 29 and displacement piston 28 have properly assumed the fully pressurized metering. At this time, also, the metering plunger 29 acts as a passage shutoff valve by shifting of the bypass groove 48 out of registration with the passage 10 so that a solid part of this plunger closes the passage.

Figure 3:
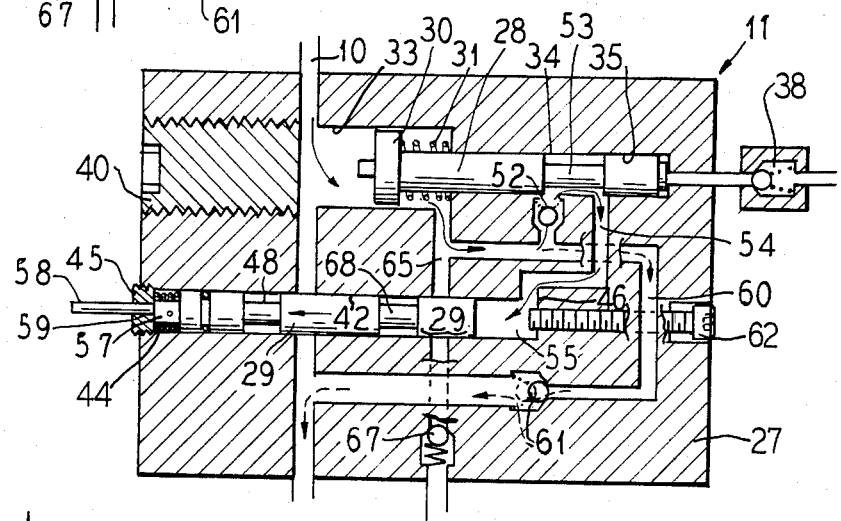
FIG. 3 is a view similar to FIG. 2 but showing the injector in another phase of operation.
Figure 4:
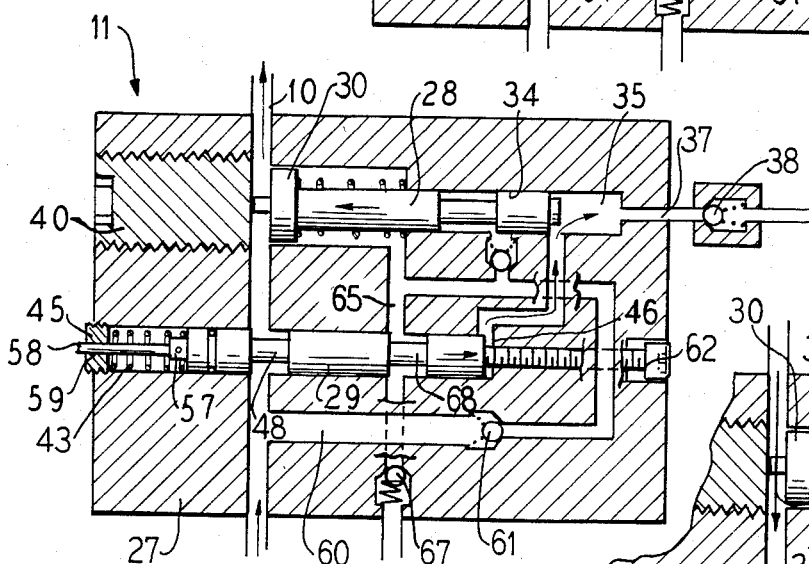
FIG. 4 is a view similar to FIGS. 2 and 3 and showing the injector in a third phase of operation.

In the fully shifted metering mode of the plunger 29 and full lubricant loading of the metering chamber 55, a spillover relief duct 60 is adapted to open past a check valve 61 to bypass pressure lubricant into the passage 10 downstream from the metering plunger 29, as indicated by dot-dash arrows in FIG. 3. This arrangement assures that adequate pressure will be imposed on the working components in the injector 11 during normal operation. It also assures that the system downstream from each of the successive injectors 11 will not be starved during normal operation of the system. The metering plungers 29 and the relief ducts 60 in the respective injectors are thus in parallel connection, i.e., a malfunction in an upstream injector will not prevent supply of lubricant to downstream injectors, via either the passage 10 or the duct 60, because these channels cannot be simultaneously blocked by the plunger 29.

When the desired line pressure has been attained in the passage 10, the pump motor 18 and the solenoid 21 are deenergized and the valve 22 is shifted from its pressure supply mode to its lubricant return mode. Upon opening of the passage 10 through the valve 22 to the reservoir 13, the line pressure drops to near zero and the lubricant which has accumulated in the counterbore chambers 33 at the front sides of the several displacement plunger heads 30, as exempified in FIG. 3, will be pushed back into the passage 10 by action of the biasing springs 31 shifting the displacement plungers 28 sequentially to their starting positions, as exemplified in FIG. 4. The surplus lubricant thereby received in the passage 10 returns to the reservoir 13.

As the displacement plungers 28 are sequentially returned to their starting position, they retract from the respective lubricant displacement chambers 35 which are thus opened, with a slight vacuum developed therein. When fully retracted, the inner end portions of the respective plungers 28 disconnect the passageways 54 from the ducts 50 and communication is established through the passageways 54 with the displacement chambers 35 and thereby with the makeup or metering chambers 55, for charging of the metered volumes of lubricant in the chambers 55 into the displacement chambers 35 by releasing of the metering plunger 29 in each of the injectors for return biasing to the metering plunger starting position. This also opens the passage 10 through the bypass cavity grooves 48 of the plungers 29, thus facilitating return of the surplus lubricant to the reservoir 13 in a sequential manner.

It may be observed that the volume of lubricant for each lubricating charge can be readily fine adjusted by means of an adjustment screw 62 acting on the lubricant driving end of the respective associated plunger 29 for controlling the volume of lubricant which will be displaced from the chamber 55 to the chamber 35 in each cycle.

Due to the peculiar operating environment in which the injectors 11 must operate, malfunctions may occur which may affect any of the plungers 28 and 29. Such malfunction may result from a blocked lubrication line because of foreign matter clogging the line, but more likely because a lubrication line duct becomes accidentally deformed against free flow as by a bending kink or a smashed or cramped blockage. As a result one or both of the plungers in any of the injectors 11, may be starved and fail to respond in an operating cycle to system requirements, and cause abnormal line pressure fluctuations in the passage 10.

Pressure sensing and signalling means are therefore provided in the system for any point not receiving lubricant. Such means desirably comprise pressure reader or sensor 63 (FIG. 1) at the downstream end of the passage 10 and including a pressure-sensing normally closed electrical switch 63a connected in an electrical operating circuit to the control unit 15.

A fault indicator 64 (FIG. 1) is desirably provided in the electrical circuitry connecting the pressure sensor 63 and the control unit 15. Any preferred fault-indicating device may be employed, such a trouble-indicating light, a sounding device, a flasher or any combination of these as may be preferred. To avoid dry bearings at points other than the bearing associated with the malfunctioning injector 11, the system should not be shut down, but the fact of a fault somewhere in the system should be revealed. The fault indicator 64 is intended to indicate abnormal pressure in the system less than the sensor 63 has been set for.

By way of example, at the beginning of the pressure phase in the cycle of operation, a predetermined holding interval is provided for until full line pressure is reached in the passage 10 for activating the sensor 63. For instance, the holding interval may be on the order of two minutes while the pressure is being built up in the system and then the several injectors 11 should be functioning in the injection and metering modes. If the pressure then reaches the predetermined maximum for which the system has been set, such as 2000 psi, the sensor switch 63a opens and thus signals the control unit that the system is functioning normally, and the fault indicator remains dormant. However, if the pressure does not reach the preferred level, within the pressure buildup time interval in the pressure phase, the sensor switch 63a will remain closed and the fault indicator will be actuated and announce, i.e. signal, a malfunction which should then be traced to the affected injector 11.

On the other hand, if during the return phase of the system the pressure fails to drop to a desired level, the fault indicator 64 will also signal that condition in the system, and the fault should be traced.

For example, if one of the metering plungers 29 has failed to function properly either by remaining in its retracted position, or, conversely, in its protracted position, the telltale 58 will so indicate.

Figure 5:
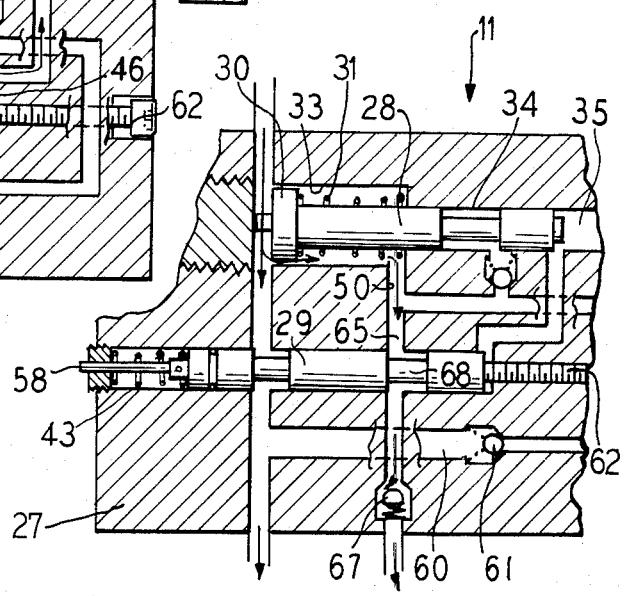
FIG. 5 is a similar view of the injector demonstrating operation of a bypass in the event of malfunction of the lubricant displacement plunger.

Should one of the displacement plungers 28 fail to respond to line pressure in the pressure phase of operation of the system, as indicated in FIG. 5, not only will the associated metering plunger 29 remain stationary in its retracted position but lubricant bypassing the pressure head 30 will pass by way of the passage 50 and a dumping bypass passage branch 65 extending therefrom through a relief device 67 to atmosphere where the dumping can be traced to the affected injector 11. Failure of the plunger 28 to shift results in the associated plunger 29 remaining dormant, so that a pass-through recess or groove 68 in the plunger 29 remains in registration with the passage branch 65 which is normally blocked by the plunger 29 during proper functioning of the injector 11.

By way of example, the dumping relief valve 67 may be adjusted to blow, or open in response to 1500 psi where the desired line pressure at the end of the pressure phase of the system should be 2000 psi. However, due to the pressure differential because the pressure can escape at the lower 1500 psi value from the blocked injector 11, the pressure throughout the system will remain at the 1500 psi so that the sensor 63 will fail to signal the control unit at the end of the pressure phase of the cycle. Therefore, the fault indicator 64 will be activated to announce the malfunction. Then the blocked injector 11 can be traced by the presence of escaped lubricant. During this malfunction, the check valve 52 will remain unaffected because its passage 54 is blocked by the affected plunger 28.

While there may be a blocked point in one or more of the injectors 11 or a stuck plunger due to contamination, as indicated by the fault indicator 64, the lubricant-applying system will continue to function cyclically uninterruptedly under the control of the control unit 15 and the timer 17 so that the properly functioning injectors 11 will continue to supply their associated bearings requiring lubrication until the system returns to normal, as by spontaneous release and return to normal function of the affected plunger, by surge jogging the system, or by manipulative release of a stuck plunger 29 or to correct a blocked lube point by pushing or pulling its tell-tale 58. Of course, if any of the mentioned procedures does not cure the malfunction, it may be necessary to shut down the system to cure the problem.

From the foregoing, it will be apparent that the present invention provides a lubricant applying system which is adapted to function cyclically in a timed automatic manner, and which has new and improved means for positive monitoring of blockages in the system. Furthermore, a new and improved injector structure is provided for lubricant applying systems.

It will be understood that many variations and modifications may be effected without departing from the spirit and scope of the novel concepts of this invention.

I claim as my invention:

1. A lubricant applying system provided with at least one lubricant injector structure having means for lubricant delivery to at least one respective point of use, and comprising:

a lubricant supply and return passage means connected with said injector structure;

operating means at one end of said passage means functioning cyclically for in one phase supplying lubricant under predetermined pressure from a source through said passage means for sequentially discharging and recharging said injector structure, and for in a second phase and after said recharging permitting return of surplus lubricant from said injector structure in a sequential manner through said passage means to said source;

pressure sensing and signaling means connected to an opposite end of said passage means for monitoring pressure conditions in said passage means;

said at least one injector structure containing a lubricant displacement plunger and a lubricant metering plunger;

means normally biasing said displacement plunger toward one end;

a pressure responsive head on said one end of said displacement plunger for direct exposure to pressure in said passage means for effecting shifting of said displacement plunger in opposition to said biasing means in a lubricant displacement stroke toward its opposite end and into a lubricant displacement chamber at such end from which lubricant is thereby ejected through a port communicating with one of said points of use, the displacement plunger being then returned to said one end upon release of pressure in said passage means;

said injector structure including means completing a metering chamber in combination with one end of said metering plunger and adapted to be substantially occupied by the metering plunger in one operating mode of the metering plunger and to be vacated by the metering plunger in a second operating mode thereof;

said injector structure a passageway connecting said metering chamber with said displacement chamber;

means normally biasing said metering plunger into said one operating mode;

said metering plunger being adapted in said one operating mode for opening said lubricant passage means and by occupying said metering chamber driving lubricant from said metering chamber through said passageway into said displacement chamber, and being adapted in said second operating mode for closing said lubricant passage means and vacating said metering chamber in response to lubricant pressure in said metering chamber; and said injector structure and said displacement plunger including metering chamber pressurizing and recharging means controlled by said displacement plunger for selectively effecting communication between said lubricant passage means and said passageway in the displacement stroke of said displacement plunger, so that lubricant under pressure will be charged into said metering chamber and cause said metering plunger to shift into said second operating mode and when pressure is released said metering plunger will be shifted into said first operating mode by its biasing means for thereby driving a charge of lubricant from said metering chamber through said passageway into said displacement chamber.

2. A system according to claim 1, wherein said operating means comprises a timer in charge of an electrical driving motor of a pump and also in charge of an electrical control for a valve for alternately connecting said one end of said passage supply/return means with a lubricant source through said pump in said one phase and for connecting said one end of said passage supply/return means with said lubricant source for return of surplus lubricant in said second phase.

3. A system according to claim 1, wherein said operating means includes means for selectively predetermining said pressure.

4. A system according to claim 1, wherein said structure includes a relief duct connecting said pressurizing and recharging means and said passage means for returning lubricant to said passage means after said metering chamber has been filled and while said metering plunger is still in said second operating mode.

5. A system according to claim 1, wherein said metering plunger carries a tell-tale for determining functioning thereof, and said structure includes means for controlling the lubricant volume in the charge of lubricant driven from said metering chamber into said displacement chamber.

6. A system according to claim 1, wherein said pressure sensing and signaling means includes a sensor at said opposite end of said passage means for generating a signal if the pressure in said supply and return passage means line falls below a selected level and a fault indicator connected with said sensor for displaying said signal.

7. A system according to claim 6, wherein said sensor comprises a pressure-sensitive switch and said fault indicator is electrically connected with said switch.

8. A system according to claim 1, including means in said injector structure defining a bore in which said displacement plunger is reciprocatable, said bore having a larger diameter counterbore opening to said passage means and providing an inner end abutment spaced from said passage means, said biasing means for said displacement plunger comprising a coiled compression spring about said displacement plunger and thrusting at one end against said abutment, and said spring having an opposite end against said head.

9. A system according to claim 8, wherein said pressurizing and recharging means comprises a bypass from the inner end of said counterbore and through a valve recess in said displacement plunger communicating with said passageway when the displacement plunger is in said displacement stroke.

10. A system according to claim 1, wherein said structure includes a relief device and passage for dumping lubricant when lubricant pressure in said injector structure exceeds a fixed limit.

11. A system according to claim 10, wherein said metering plunger closes said relief passage when the displacement plunger functions normally in its lubricant displacement stroke.

12. A lubricant applying system injector adapted for connection in supply relationship with a plurality of like lubricant injectors along a lubricant passage adapted for cyclically alternately supplying lubricant under line pressure to the injectors and for releasing pressure therefrom, and each injector adapted for lubricant delivery to a respective point of use, and comprising:
a housing; displacement plunger and a lubricant metering plunger;
means normally biasing said displacement plunger toward one end;
a pressure responsive head on said one end of said displacement plunger for direct exposure to line pressure in said passage for shifting of said displacement plunger in opposition to said biasing means in a lubricant displacement stroke toward its opposite end and into a lubricant displacement chamber at such end from which lubricant is thereby ejected through a port communicating with said points of use, the displacement plunger being then returned to said one end upon said release of pressure in said lubricant passage;
said housing including means completing a metering chamber in combination with one end of said metering plunger and adapted to be substantially occupied by the metering plunger in one operating mode of the metering plunger and to be vacated by the metering plunger in a second operating mode thereof;
said housing including a passageway connecting said metering chamber with said displacement chamber;
means normally biasing said metering plunger into said one operating mode;
said metering plunger being adapted in said one operating mode for opening said lubricant passage and by occupying said metering chamber driving lubricant from said metering chamber through said passageway into said displacement chamber, and being adapted in said second operating mode for closing said lubricant passage and vacating said metering chamber in response to lubricant pressure in said metering chamber; and
said housing and said displacement plunger including metering chamber pressurizing and recharging means controlled by said displacement plunger for selectively effecting communication between said lubricant passage and said passageway in the displacement stroke of said displacement plunger, so that lubricant under pressure will be charged into said metering chamber and cause said metering plunger to shift into said second operating mode and when the pressure is released said metering plunger will be shifted into said first operating mode by its biasing means for thereby driving a charge of lubricant from said metering chamber through said passageway into said displacement chamber.

13. A lubricant applying system injector according to claim 12, wherein said pressurizing and recharging means comprises a bypass through a valve recess in said displacement plunger communicating with said passageway when the displacement plunger is in said displacement stroke relation.

14. A lubricant applying system injector according to claim 12, wherein said housing includes a relief duct connecting said pressurizing and recharging means and said passage for returning pressure lubricant to said passage.

15. A lubricant applying system injector according to claim 12, wherein said housing includes a relief duct connecting said pressurizing and recharging means and said passage for returning lubricant to said passage after said metering chamber has been filled and while said metering plunger is still in said second operating mode.

16. A lubricant applying system injector according to claim 12, wherein said housing includes a bypass passage branch for dumping lubricant away from said displacement plunger when the displacement plunger fails to respond to line pressure imposed on said head, and said metering plunger closing said bypass passage branch when said displacement plunger functions properly in its lubricant displacement stroke.

17. A lubricant applying system injector according to claim 12, wherein said metering plunger carries a telltale for determining functioning thereof, and means for controlling the lubricant volume in the charge of lubricant driven from said metering chamber into said displacement chamber.

18. A system for supplying lubricant to a plurality of points from a lubricant source comprising:
- a plurality of injectors respectively communicating with said points for delivering said lubricant thereto, each said injector having a housing;
- a lubricant supply and return line passing through all of said injectors;
- a pumping means for connecting to said lubricant source and connected to said lubricant supply and return line through a valve means and a control means operating said pumping means and said valve means in combination for periodically supplying lubricant under pressure through said lubricant supply and return line to each of said injectors during a supply phase of operation and for stopping supply of lubricant and connecting said lubricant supply and return line to said lubricant source during a following return phase of operation;
- each of said injector housings having a displacement chamber communicating with one of said points and a displacement plunger movable in said displacement chamber, said displacement plunger having a head normally disposed by a first bias means for direct exposure to pressurized lubricant supplied during said supply phase in said lubricant supply and return line forcing said plunger against said first bias means expelling lubricant from said displacement chamber to said one point;
- each of said injector housings further having a metering chamber with a metering plunger movable therein, said metering plunger disposed for moving through said supply and return line against a second bias means and having blocking means normally disposed out of said supply and return line;
- each of said injector housings further having a first passage connecting said displacement chamber and said metering chamber, said first passage being normally closed to said supply and return line by said displacement plunger when said pumping means is off and being opened to said receive lubricant from said supply and return line by movement of said displacement plunger during said supply phase permitting flow of lubricant through said fist passage to said metering chamber forcing said metering plunger against said second bias means such that said blocking means blocks said supply and return line;
- each of said injector housings and said displacement plungers further having a metering chamber pressurizing and recharging means controlled by its said displacement plunger for selectively effecting communication between said lubricant supply and return line and its said first passage in strokes of said displacement plunger expelling lubricant from its said displacement chamber, so that during said supply phase said metering chamber is charged with lubricant under pressure causing its said metering plunger to shift compressing its said second bias means, and during said return phase said second bias means forces said metering plunger into said metering chamber expelling lubricant therein through said first passage to said displacement chamber for recharging said displacement chamber, said first bias means moving said displacement plunger to a position closing said first passage to said supply and return line, and said blocking means being moved out of said supply and return line permitting return of excess lubricant therethrough from said other injectors to said lubricant source; and
- each of said injector housings further having a second passage connected to said metering chamber pressurizing and recharging means and to said supply and return line enabling lubricant to bypass said blocking means to supply lubricant to said other injectors when said supply and return line is blocked by said blocking means.

* * * * *